(12) United States Patent
Agematsu

(10) Patent No.: US 7,414,340 B2
(45) Date of Patent: Aug. 19, 2008

(54) MOTOR

(75) Inventor: Ikuo Agematsu, Nagano (JP)

(73) Assignee: Nidec Sankyo Corporation (JP)

( * ) Notice: Subject to any disclaimer, the term of this patent is extended or adjusted under 35 U.S.C. 154(b) by 11 days.

(21) Appl. No.: 11/656,793

(22) Filed: Jan. 23, 2007

(65) Prior Publication Data

US 2007/0170797 A1 Jul. 26, 2007

(30) Foreign Application Priority Data

Jan. 24, 2006 (JP) ............................. 2006-015036

(51) Int. Cl.
*H02K 5/16* (2006.01)
(52) U.S. Cl. ..................................... 310/90; 310/49 R
(58) Field of Classification Search ............... 310/49 R, 310/90, 156.26; *H02K 37/04*
See application file for complete search history.

(56) References Cited

U.S. PATENT DOCUMENTS

| 3,633,044 | A | * | 1/1972 | Maier | .................... 310/156.26 |
|---|---|---|---|---|---|
| 3,735,165 | A | * | 5/1973 | Touchman et al. | ......... 310/49 R |
| 4,438,361 | A | * | 3/1984 | Manson | ........................ 310/90 |
| 5,097,162 | A | * | 3/1992 | Wang | ........................ 310/49 R |
| 5,747,897 | A | * | 5/1998 | Iwasa et al. | ................ 310/49 R |
| 5,895,120 | A | * | 4/1999 | Campbell et al. | ............ 384/420 |
| 2006/0261684 | A1 | * | 11/2006 | Sonohara et al. | ........... 310/49 R |

FOREIGN PATENT DOCUMENTS

JP      2005-20857      1/2005

* cited by examiner

*Primary Examiner*—Thanh Lam
(74) *Attorney, Agent, or Firm*—Cantor Colburn LLP

(57) ABSTRACT

A motor may include a rotor provided with a permanent magnet, a stator whose inner peripheral face faces an outer peripheral face of the permanent magnet, a first radial bearing fixed to an end portion on an output side of the stator for rotatably supporting the rotor shaft on an output side, a second radial bearing rotatably supporting the rotor shaft on an opposite output side, a spring member which is disposed between the first radial bearing and an end face on the output side of the rotor for urging the rotor on an opposite output side, and a thrust bearing plate which is fixed to an end portion on the opposite output side of the stator and with which a shaft end on the opposite output side of the rotor shaft is abutted.

3 Claims, 2 Drawing Sheets

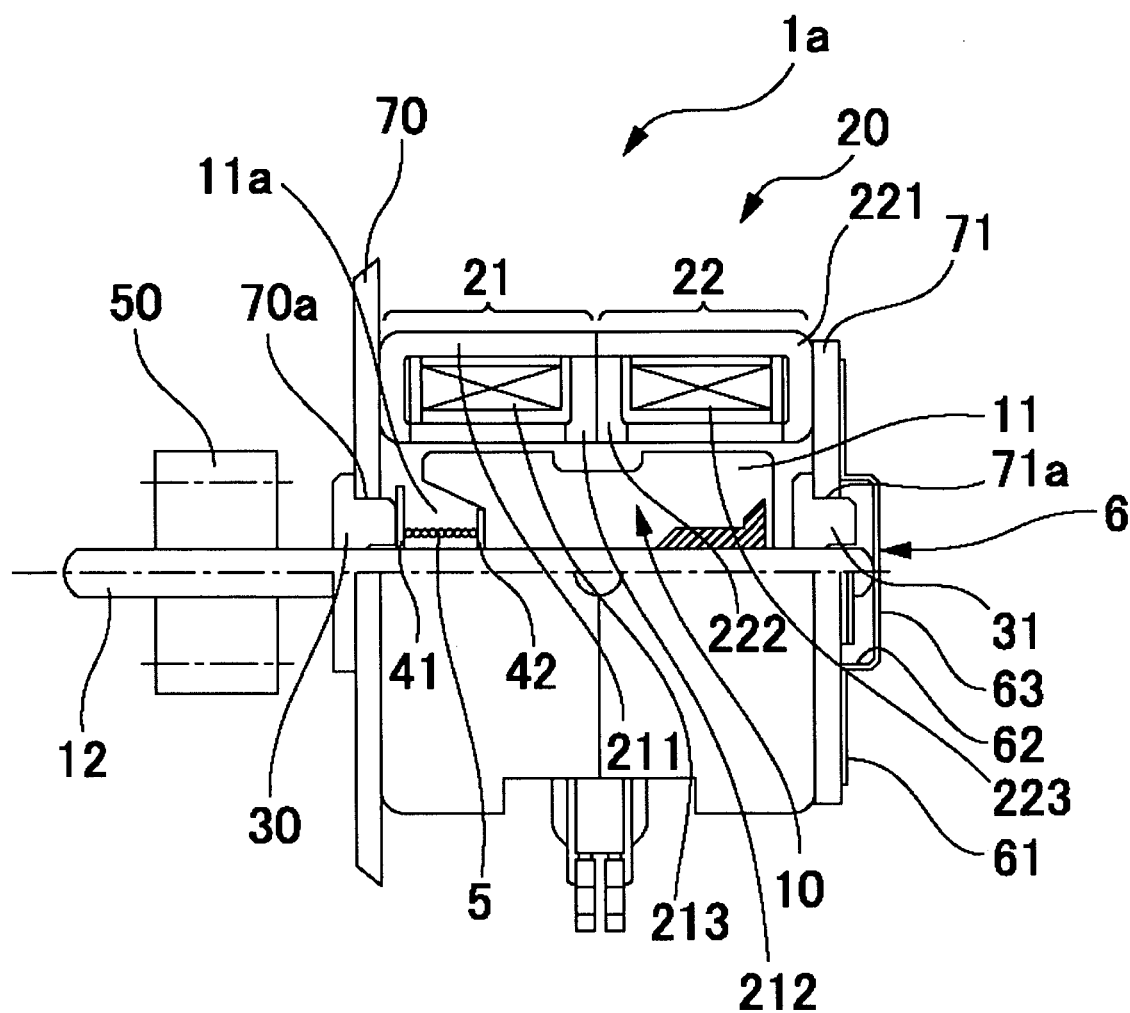
[Fig. 1]

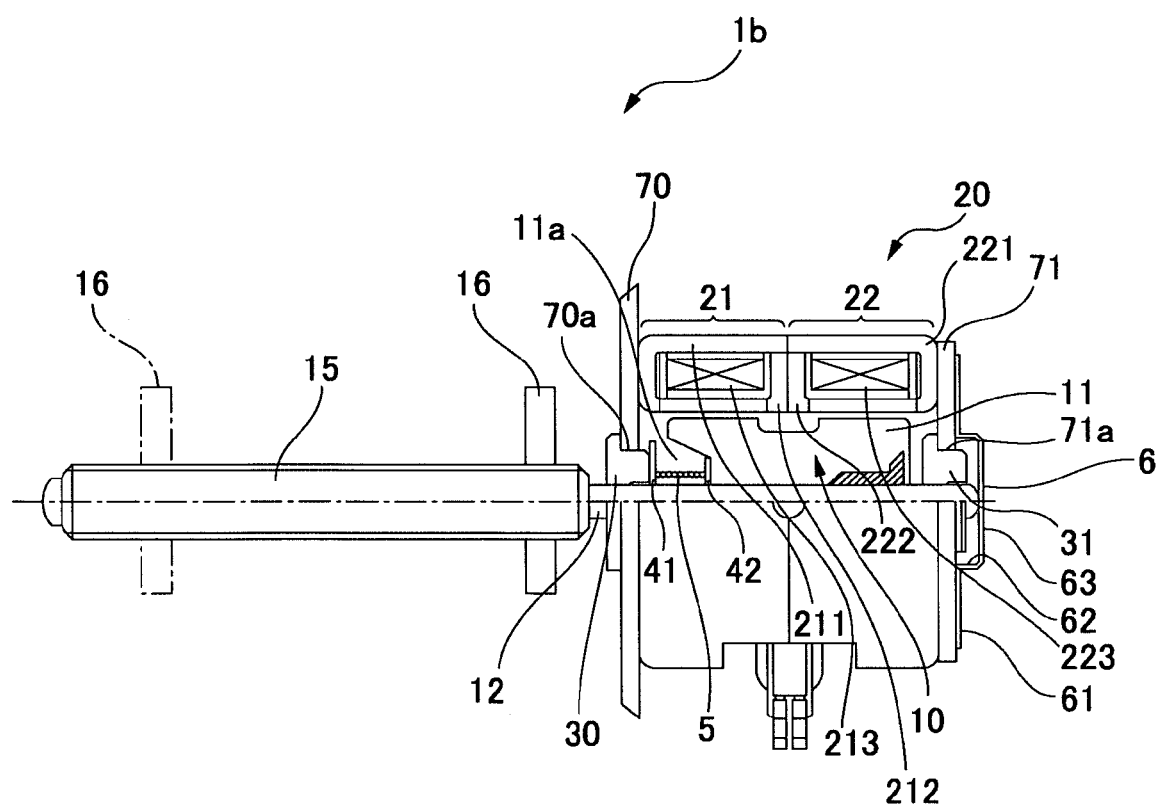
[Fig. 2]

MOTOR

CROSS REFERENCE TO RELATED APPLICATION

The present invention claims priority under 35 U.S.C. §119 to Japanese Application No. 2006-15036 filed Jan. 24, 2006, which is incorporated herein by reference.

FIELD OF THE INVENTION

The present invention relates to a structure of a motor. More specifically, the present invention relates to a motor having a structure in which a rotor shaft is urged in a thrust direction.

BACKGROUND OF THE INVENTION

A motor has been known in which a rotor having a permanent magnet, which is fixed to an outer peripheral face of a rotor shaft, is disposed on an inner side of an ring-shaped stator. In this motor, unless the rotor shaft is urged in a thrust direction, when the rotor shaft is rotated, the rotor shaft wobbles in the thrust direction to cause wear to occur in a radial bearing and a noise to generate.

In order to solve the above-mentioned problems, following structures have been known. For example, in a motor in which a U-shaped mounting plate is fixed to an end face on an output side of a stator, an end portion on an opposite output side of a rotor is urged in an output side by a flat spring and a shaft end on the output side of rotor shaft is supported with a bag shaped bearing that is fixed to an end portion of the mounting plate. Alternatively, a rotor shaft is urged on an output side by a coil spring which is disposed between a stepped portion of the rotor shaft and an end face on the output side of a stator, and a shaft end on the output side of the rotor shaft is supported by a bag shaped bearing which is fixed to an end portion of a mounting plate (see, for example, Japanese Patent Laid-Open No. 2005-20857).

However, in the structure disclosed in the above patent reference, the rotor shaft is urged on the output side and the shaft end on the output side of the rotor shaft is supported in a thrust direction. Therefore, the structure can be employed, for example, in the case that a U-shaped mounting plate is fixed to an end face on the output side of the stator like a motor in which a feed screw is formed on the rotor shaft, or in the case that an equipment on which a motor is mounted is provided with a portion for supporting a shaft end on the output side of a rotor shaft. In other words, this structure can be applied only to a case where a shaft end on the output side of a rotor shaft is capable of being supported and thus its application is limited.

Further, in the motor disclosed in the above-mentioned patent reference, when an urging force is applied to a carriage in an output side direction in order to prevent a backlash between a feed screw and the carriage, both of an urging force for preventing the rotor shaft from shaking in a thrust direction and an urging force for preventing the backlash are applied to a portion which supports the shaft end on the output side of the rotor shaft in the thrust direction and thus a large torque loss occurs.

Alternatively, in the case that a rotor shaft is urged toward an opposite output side (opposite side with respect to output side), in a conventional motor, an end face on the opposite output side of the rotor is required to be supported by an end face on the output side of a radial bearing which supports the rotor shaft on an opposite output side. According to the structure described above, since the end face on the opposite output side of the rotor face-contacts with the end face on the output side of the radial bearing, torque loss is large.

SUMMARY OF THE INVENTION

In view of the problems described above, an embodiment of the present invention may advantageously provide a motor in which a rotor shaft is prevented from wobbling in a thrust direction even in a state where a shaft end on the output side of the rotor shaft is unable to be supported in the thrust direction, and in which torque loss is capable of being reduced even when the wobbling is prevented.

Thus, according to an embodiment of the present invention, there may be provided a motor including a rotor which is provided with a permanent magnet on an outer peripheral face of a rotor shaft, a stator whose inner peripheral face faces an outer peripheral face of the permanent magnet, a first radial bearing which is fixed to an end portion on an output side of the stator for rotatably supporting the rotor shaft on an output side, a second radial bearing which rotatably supports the rotor shaft on an opposite output side, a spring member which is disposed between the first radial bearing and an end face on the output side of the rotor for urging the rotor on an opposite output side, and a thrust bearing plate which is fixed to an end portion on the opposite output side of the stator and with which a shaft end on the opposite output side of the rotor shaft is abutted.

In this specification, the expression that "the first radial bearing is fixed to an end portion on the output side of the stator" means not only that the first radial bearing may be directly fixed to an end portion on the output side of the stator but also that the first radial bearing may be fixed to an end portion on the output side of the stator through another member. Further, the expression that "a thrust bearing plate is fixed to an end portion on the opposite output side of the stator" means not only that the thrust bearing plate may be directly fixed to an end portion on the opposite output side of the stator but also that the thrust bearing plate may be fixed to an end portion on the opposite output side of the stator through another member.

In accordance with an embodiment, the rotor shaft is urged on the opposite output side by the spring member and the shaft end on the opposite output side of the rotor shaft is supported with the thrust bearing plate. Therefore, when the rotor shaft is rotated, the rotor shaft does not wobble in a thrust direction and thus abrasion of the radial bearing and occurrence of a large noise can be prevented. Further, the spring member is disposed between the first radial bearing disposed on the output side and the end face on the output side of the rotor, and the thrust bearing plate is fixed to the opposite output side of the stator. Therefore, wobbling in a thrust direction of the rotor shaft can be prevented within a main body of the motor. Accordingly, even when the shaft end on the output side of the rotor shaft is unable to be supported, the rotor shaft can be prevented from wobbling in the thrust direction. Further, the rotor shaft urged on the opposite output side is supported in a nearly point contact state by the thrust bearing plate with which the shaft end is abutted and thus torque loss due to sliding at the abutting portion is reduced. In addition, in the case that a feed screw is provided in the rotor shaft and a carriage is moved along the rotor shaft by a feed screw mechanism, even when an urging force in an opposite output side direction is applied to the carriage to prevent backlash between the feed screw and the carriage, the shaft end on the opposite output side of the rotor shaft is supported in a nearly point contact state by the thrust bearing plate and thus torque loss due to sliding at the abutting portion is restrained.

In accordance with an embodiment, the spring member is a coil spring. A coned disk spring as well as a coil spring may be used as the spring member but, when the coil spring is used, although its diameter is small, a stable urging force can be obtained in comparison with a coned disk spring.

In accordance with an embodiment, a ring-shaped recessed part is formed on an end face on the output side of the rotor and an end portion on the opposite output side of the coil spring is disposed in the ring-shaped recessed part. According to the structure as described above, the coil spring can be disposed under a state that a gap space in a thrust direction between the first radial bearing and the end face on the output side of the rotor is narrow. Therefore, the size of the motor can be made smaller and thinner. Specifically, the motor may be structured such that the motor is a stepping motor, the stator includes a pair of stator assemblies which are superposed on each other in the axial direction, a first end plate is fixed to an end face on the output side of one of a pair of stator assemblies located on the output side, the first radial bearing is fixed to the first end plate, and the ring-shaped recessed part is formed in an end face on the output side of the permanent magnet.

In accordance with an embodiment, the thrust bearing plate includes a circular ring shaped flange part which is fixed to an end face on the opposite output side of the stator, and a bottomed cylindrical part which is extended on the opposite output side from an inner circumferential edge portion of the circular ring shaped flange part and which includes a bottom part of the bottomed cylindrical part for supporting the shaft end on the opposite output side of the rotor shaft. When the cup-shaped thrust bearing plate as described above is used, the inside of the cylindrical part may be utilized as an oil reservoir and thus outflow of oil can be prevented.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 is a half cross sectional view showing a structure of a motor in accordance with a first embodiment of the present invention.

FIG. 2 is a half cross sectional view showing a structure of a motor in accordance with a second embodiment of the present invention.

DETAILED DESCRIPTION OF THE PREFERRED EMBODIMENTS

A motor in accordance with an embodiment of the present invention will be described below with reference to the accompanying drawings.

First Embodiment

FIG. 1 is a half cross sectional view showing a structure of a motor in accordance with a first embodiment of the present invention. As shown in FIG. 1, a motor 1a in accordance with a first embodiment is a stepping motor which includes a rotor shaft 12 structuring an output shaft, a rotor 10 provided with a cylindrical permanent magnet 11 that is fixed to an outer peripheral face of the rotor shaft 12, and a cylindrical stator 20 whose inner peripheral face faces an outer peripheral face of the permanent magnet 11. An N-pole and an S-pole are alternately disposed on the outer peripheral face of the permanent magnet 11 in its peripheral direction. Further, a gear 50 is fixed to the rotor shaft 12 on its output side.

The stator 20 includes a pair of stator assemblies 21, 22 which are superposed on each other in the axial direction. The stator assemblies 21, 22 are respectively provided with ring-shaped coils 213, 223 each of which is wound around an insulator, and stator cores 211, 212, 221, 222 which are disposed on both sides of the coils 213, 223 in the axial direction. The stator cores 211, 212, 221, 222 are respectively provided with a number of pole teeth along the inner peripheral faces of the coils 213, 223. The pole teeth which are formed in each of the stator cores 211, 212, 221, 222 are alternately disposed on the inner peripheral face side of the stator 20 in its peripheral direction.

A first end plate 70 which is utilized as a fixing plate when the motor 1a is mounted on an apparatus or the like is fixed to an end face of the stator core 211 of the stator 20 which is located on the output side and an opening 70a is formed in the first end plate 70. A first radial bearing 30 formed in a cylindrical shape is fixed to the opening 70a to rotatably support the rotor shaft 12 on the output side. The first radial bearing 30 is fixed to an end portion on the output side of the stator 20 through the first end plate 70.

A second end plate 71 is fixed to an end face of the stator core 221 located on the opposite output side of the stator 20 and an opening 71a is formed in the second end plate 71. A second radial bearing 31 formed in a cylindrical shape is fixed in the opening 71a to rotatably support the rotor shaft 12 on the opposite output side. The second radial bearing 31 is fixed to the end portion on the opposite output side of the stator 20 through the second end plate 71.

In the motor 1a which is structured as described above, in order to prevent the rotor shaft 12 from wobbling in a thrust direction when the rotor 10 is rotated, a coil spring 5 as a spring member for urging the rotor shaft 12 in the opposite output side is disposed around the rotor shaft 12 between the first radial bearing 30 and the end face on the output side of the rotor 10 (end face on the output side of the permanent magnet 11). In order to arrange the coil spring 5 as described above, in accordance with the first embodiment of the present invention, a ring-shaped recessed part 11a which is formed to open as its diameter increases toward the output side is concentrically formed with the rotor shaft 12 in the end face on the output side of the permanent magnet 11. The portion on the opposite output side of the coil spring 5 is accommodated in the inside of the ring-shaped recessed part 11a. In accordance with this first embodiment, a first washer 41 having a large diameter is disposed between an end portion on the output side of the coil spring 5 and an end face on the opposite output side of the first radial bearing 30. A second washer 42 having a small diameter is disposed between an end portion on the opposite output side of the coil spring 5 and a bottom part of the ring-shaped recessed part 11a. When the rotor shaft 12 is rotated, sliding faces are formed between the first radial bearing 30 and the washer 41 and/or between the bottom part of the ring-shaped recessed part 11a and the second washer 42.

A thrust bearing plate 6 which bears a shaft end on the opposite output side of the rotor shaft 12 is disposed on a face on the opposite output side of the second end plate 71 in an overlapped manner. The thrust bearing plate 6 is provided with a circular ring shaped flange part 61 which is fixed to the end portion on the opposite output side of the stator 20 through the second end plate 71 and a bottomed cylindrical part 62 which is extended to the opposite output side from an inner circumferential edge of the circular ring shaped flange part 61. A bottom part 63 of the cylindrical part 62 supports the shaft end on the opposite output side of the rotor shaft 12. The shaft end on the opposite output side of the rotor shaft 12 is formed in a substantially hemispheric face and the thrust bearing plate 6 supports the shaft end on the opposite output side of the rotor shaft 12 in a point contact state.

As described above, in the motor 1a in accordance with the first embodiment, the coil spring 5 urges the rotor shaft 12 to the opposite output side and the shaft end on the opposite output side of the rotor shaft 12 is supported by the thrust bearing plate 6. Therefore, wobbling of the rotor shaft 12 in the thrust direction is prevented when the rotor shaft 12 is rotated and abrasion of the radial bearings 30, 31 and occurrence of a large noise is prevented.

Further, the coil spring 5 is disposed between the first radial bearing 30 on the output side and the end face on the output side of the rotor 10 (end face on the output side of the permanent magnet 11), and the thrust bearing plate 6 is fixed to the end portion on the opposite output side of the stator 20. Therefore, wobbling in the thrust direction of the rotor shaft 12 is prevented within the main body of the motor. Accordingly, even when the shaft end on the output side of the rotor shaft 12 is unable to be supported, the rotor shaft 12 is prevented from wobbling in the thrust direction.

Further, the rotor shaft 12 urged to the opposite output side is supported by the thrust bearing plate 6 with which its shaft end abuts. The rotor shaft 12 is supported in a substantially point contact state and thus loss of torque due to sliding at the bearing portion is restrained.

A coned disk spring except the coil spring 5 may be used as a spring member. However, since the coil spring 5 is used in the first embodiment, a stable urging force with a small diameter can be obtained in comparison with a coned disk spring.

The ring-shaped recessed part 11a into which the end portion on the opposite output side of the coil spring 5 is accommodated is formed at the end face on the output side of the rotor 10 (end face of the output side of the permanent magnet 11). Therefore, the coil spring 5 can be disposed in the state that a gap space in the thrust direction between the first radial bearing 30 and the end face on the output side of the permanent magnet 11 is set to be narrow. Accordingly, the motor 1a can be made smaller and thinner.

Further, the thrust bearing plate 6 is formed in a cup shape provided with the circular ring shaped flange part 61 and the bottomed cylindrical part 62. Therefore, an inside of the cylindrical part 62 can be utilized as an oil reservoir and, in this case, outflow of oil is prevented even when oil is applied to a sliding portion of the second radial bearing 31.

Second Embodiment

FIG. 2 is a half cross sectional view showing a structure of a motor in accordance with a second embodiment of the present invention. A basic structure of the motor in accordance with the second embodiment is similar to that of the first embodiment and thus the same notational symbols are used to common portions and detailed description will be omitted.

In a motor 1b shown in FIG. 2, similarly to the first embodiment, a rotor shaft 12 is urged on the opposite output side by a coil spring 5 and the shaft end on the opposite output side of the rotor shaft 12 is supported in a nearly or substantially point contact state by a cup-shaped thrust bearing plate 6. The coil spring 5 is disposed between a first radial bearing 30 disposed on the output side and the end face on the output side of a rotor 10, and the thrust bearing plate 6 is fixed to the end portion on the opposite output side of a stator 20. A ring-shaped recessed part 11a is formed in the end face of a permanent magnet 11 on the output side of the rotor 10, and the end portion on the opposite output side of the coil spring 5 is accommodated in the inside of the ring-shaped recessed part 11a.

In the second embodiment, a front portion of the rotor shaft 12 is formed with a feed screw shaft 15 whose diameter is larger than the rotor shaft 12, and a carriage 16 is mounted on the feed screw shaft 15.

When the motor 1b structured as described above is mounted on an apparatus, an urging force in an opposite output side direction is applied to the carriage 16 by a backlash preventing spring (not shown) to prevent a backlash between the feed screw shaft 15 and the carriage 16. In this case, the shaft end on the opposite output side of the rotor shaft 12 is supported by the thrust bearing plate 6 in a nearly or substantially point contact state and thus loss of torque due to sliding at the thrust bearing plate 6 is suppressed in a low level. Moreover, the rotor shaft 12 is only required to be applied with a load for restraining a backlash from the outside, and thus a spring coefficient of the backlash preventing spring can be reduced. Accordingly, even when the carriage 16 is moved, for example, from a position shown by the solid line to a position shown by the alternate long and short dash line, variation of the load applied to the rotor shaft 12 is reduced.

Other Embodiments

In the embodiments described above, the first radial bearing 30 is fixed to the end portion on the output side of the stator 20 through the first end plate 70. However, the first radial bearing 30 may be directly fixed to the end portion on the output side of the stator 20. Also, in the embodiments described above, the second radial bearing 31 is also fixed to the end portion on the opposite output side of the stator 20 through the second end plate 71. However, the second radial bearing 31 may be directly fixed to the end portion on the opposite output side of the stator 20. As described above, when the first radial bearing 30 and/or the second radial bearing 31 are directly fixed to the stator 20 without using the first end plate 70 and/or the second end plate 71, the first radial bearing 30 and/or the second radial bearing 31 are disposed into the inside of the stator 20 and thus the motor can be miniaturized and made thinner.

Also, in the embodiments described above, the thrust bearing plate 6 is fixed to the end portion on the opposite output side of the stator 20 through the second end plate 71. However, the thrust bearing plate 6 may be directly fixed to the end portion on the opposite output side of the stator 20 without using the second end plate 71.

In addition, in the embodiments described above, in order to dispose the coil spring 5 between the first radial bearing 30 and the end face on the output side of the rotor 10, the coil spring 5 is disposed between the first radial bearing 30 and the end face on the output side of the permanent magnet 11. However, the coil spring 5 may be disposed between an end face formed in a step shape (stepped end face on the output side of the rotor 10) and the first radial bearing 30 at a portion on the output side of the rotor 10 and on the opposite output side of the first radial bearing 30.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a rotor which is provided with a permanent magnet on an outer peripheral face of a rotor shaft;
   a stator whose inner peripheral face faces an outer peripheral face of the permanent magnet;
   a first radial bearing which is fixed to an end portion on an output side of the stator for rotatably supporting the rotor shaft on an output side;
   a second radial bearing which rotatably supports the rotor shaft on an opposite output side;
   a spring member which is disposed between the first radial bearing and an end face on the output side of the rotor for urging the rotor on an opposite output side; and
   a thrust bearing plate which is fixed to an end portion on the opposite output side of the stator and with which a shaft end on the opposite output side of the rotor shaft is abutted;
   wherein the spring member is a coil spring; and
   wherein a ring-shaped recessed part is formed on an output side end face of the permanent magnet so as to widen along the rotor shaft toward the first radial bearing side, and the coil spring is disposed within the ring-shaped recessed part formed in the permanent magnet.

2. The motor according to claim 1, wherein
   the motor is a stepping motor;
   the stator includes a pair of stator assemblies which are superposed on each other in the axial direction;
   a first end plate is fixed to an end face of one of a pair of the stator assemblies located on the output side;
   the first radial bearing is fixed to the first end plate; and
   the ring-shaped recessed part is formed in an end face on the output side of the permanent magnet.

3. The motor according to claim 1, wherein
   the thrust bearing plate comprises
   a circular ring shaped flange part which is fixed to an end face on the opposite output side of the stator;
   a bottomed cylindrical part which is extended on the opposite output side from an inner circumferential edge portion of the circular ring shaped flange part; and
   a bottom part of the bottomed cylindrical part which supports the shaft end on the opposite output side of the rotor shaft.

* * * * *